US009456043B1

(12) United States Patent
Froment et al.

(10) Patent No.: US 9,456,043 B1
(45) Date of Patent: Sep. 27, 2016

(54) INTRODUCTION BASED ON LOCATION AND CONTENT USAGE DATA

(71) Applicant: AMAZON TECHNOLOGIES, INC., Reno, NV (US)

(72) Inventors: Arnaud Marie Froment, San Jose, CA (US); Levon Dolbakian, Los Gatos, CA (US); Kenneth Paul Kiraly, Menlo Park, CA (US); Srinivasan Sridharan, Sunnyvale, CA (US); Jonathan White Keljo, Seattle, WA (US); Nadim Awad, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 533 days.

(21) Appl. No.: 13/919,542

(22) Filed: Jun. 17, 2013

(51) Int. Cl.
*G06Q 30/02* (2012.01)
*H04L 29/08* (2006.01)
*H04W 4/02* (2009.01)

(52) U.S. Cl.
CPC ............. *H04L 67/22* (2013.01); *G06Q 30/02* (2013.01); *H04W 4/028* (2013.01)

(58) Field of Classification Search
CPC ...... H04L 67/18–67/22; H04L 67/30–67/306; G06Q 30/02–30/0205; G01S 5/0257–5/0289; H04W 4/025–4/046
See application file for complete search history.

(56) References Cited

U.S. PATENT DOCUMENTS

| | | | |
|---|---|---|---|
| 6,718,263 B1* | 4/2004 | Glass | G07B 15/02 455/428 |
| 2008/0091342 A1* | 4/2008 | Assael | G08G 1/202 701/533 |
| 2010/0214987 A1* | 8/2010 | Mori | A63F 13/12 370/328 |
| 2011/0125794 A1* | 5/2011 | Hutschemaekers | G08G 1/202 707/776 |
| 2011/0142016 A1* | 6/2011 | Chatterjee | G06Q 30/02 370/338 |
| 2012/0170560 A1* | 7/2012 | Han | G01S 5/0252 370/338 |
| 2014/0280532 A1* | 9/2014 | MacNiven | H04L 67/18 709/204 |
| 2015/0032505 A1* | 1/2015 | Kusukame | G06Q 30/0201 705/7.31 |

* cited by examiner

*Primary Examiner* — Wing F Chan
*Assistant Examiner* — Raji Krishnan
(74) *Attorney, Agent, or Firm* — Lindauer Law, PLLC

(57) ABSTRACT

Users may access a variety of content in many locations. Described herein are systems, devices and methods for introducing users that are in close proximity to one another. Historical location data of the media devices, data indicating content usage on the media devices, or a combination of the two is used to determine a correspondence between two or more users. Once the correspondence has been determined, an introduction may be provided.

20 Claims, 9 Drawing Sheets

INTRODUCTION BASED ON LOCATION AND CONTENT USAGE DATA

BACKGROUND

Media devices such as tablets and smartphones provide ways for users to consume content, communicate with one another, and perform other tasks. These media devices may be portable, allowing use in different physical locations such as at home, while commuting, at work, and so forth.

Figure 1:
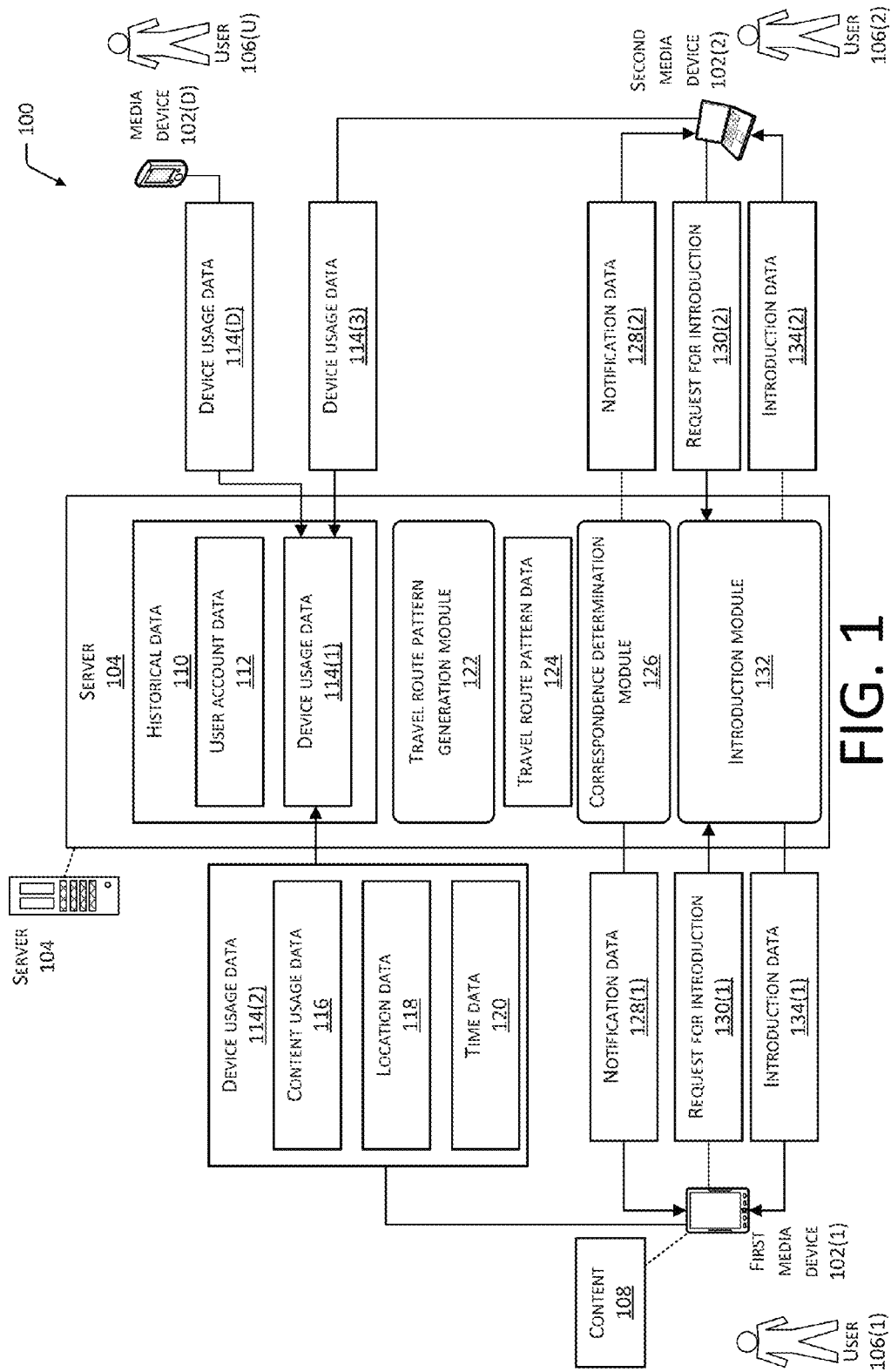
FIG. 1 is a block diagram of a system for introducing one user to another, based on travel route patterns and historical data of the users.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Traditionally, media devices have provided interfaces which allow users to be introduced to one another using social networking services. However, these introductions may involve users across the country or around the world. As a result, the user becomes connected into a social network which is more distant and provides less of a sense of local community. This disclosure relates to systems and methods for introducing users of media devices who are in close physical proximity to each other at various times and also share common interests.

Device usage data may be acquired by a server from media devices and used to develop historical data which includes data acquired over a period of time. The server may access or store the historical data associated with a plurality of user accounts which may be associated with individual users. The historical data may include content usage data which is indicative of content which has been consumed using the media device. The content usage data may indicate times in which the content has been consumed using the media device. The content may include audio data, video data, electronic book data, application data, game data, and so forth.

The historical data may include location data associated with the media devices. The location data may indicate a geographic location ("geolocation") comprising a latitude and longitude of the media device, a relative location such as on a particular train car, building, conference room, dorm room, county, city, and so forth. The location data may also include data indicating times associated with the location data. For example, the location data may indicate that the media device was located on a train from 8:00 a.m. local time to 9:00 a.m. local time.

Travel route pattern data may be determined based on the location data. The travel route patterns may be described as consistent sequences of geographic points, or routes, through which the user passes while travelling. For example, a travel route pattern for a user of a media device may be determined when the user travels on the same bicycle path, Monday through Friday, for a designated period of time (e.g., three months). In another example, a travel route pattern for the user may be determined when the user travels on a particular route for at least a threshold number of times during a month. The travel may be on foot, bicycle, automobile, common carrier, public transportation, and so forth. For example, the location data indicative of a position on train tracks may indicate the user is commuting using a train along a particular route.

The historical data may include time data which may indicate times and dates associated with the content usage data, the location data, or other device usage data. For example, the time data may indicate when the content was accessed at 8:02 a.m. local time, on Apr. 2, 2013, while the location data indicates the access occurred while the media device was on a train at particular geographic coordinates.

Based on the historical data, the server may determine a correspondence between user accounts, such as a first user account and a second user account. For example, both user accounts may share a common commute route in the morning and read similar books. Once a correspondence has been determined, the server may transmit notification data to the media devices in use by the respective user accounts. The notification data indicates the occurrence of the determination that the first user account corresponds to the second user account. The media devices may be configured to present a user interface based on the notification data which enables the users to allow or disallow introduction to the one or more other users.

If the user of a media device desires to be introduced to another user, the media devices may be configured to transmit a request for an introduction to the server. Based on the requests for the introduction, the server may transmit introduction data. The introduction data may include data about the users of the media devices. For example, the introduction data may include a picture of the user, the user's name, the user's telephone number, and so forth. The introduction data may be configured to enable the users to communicate directly with each other. In some implementations, this communication may be configured to obfuscate, conceal or hide identifying information of the users. For example, a video chat may be initiated without revealing the account name of the respective user accounts, using virtual avatars to conceal actual appearance, and so forth.

By using the techniques and systems described above, the development of social networks with others who are in common places and share common interests may be encouraged. For example, commuters who are reading the same series of novels may be introduced to one another and spend their time commuting by interacting with one another on the train.

Illustrative System

FIG. 1 is a block diagram of a system 100 for presenting an introduction based on travel route patterns and historical data of the users. The system 100 includes media devices 102(1), 102(2), . . . , 102(D) and a server 104 which are communicatively coupled using one or more networks. In this illustration, more than two media devices 102(1), 102(2), . . . , 102(D) and more than two users 106(1), 106(2), . . . , 106(U) are shown. The system 100 may include only two media devices 102(D), and only two users 106(U). The media devices may or may not be similar in construction, components, modules, and so forth.

The media device 102(D) is configured to present, store, manipulate, or otherwise participate in the consumption of content 108. The media device 102(D) may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, and so forth. In some implementations, the media device 102(D) may be referred to as an information processing system or an information processing device. The media device 102(D) is discussed in more detail below with regard to FIG. 3.

The content 108 may include audio data, video data, electronic book data, application data, game data, and so forth. The content 108 may be downloaded or streamed from a content provider to the media device 102(D).

The network facilitating communication between the media devices 102(D) and the server 104 may include a variety of networks, such as a local network, a wide area network ("WAN"), broadcast network, a personal area network, a wired and wireless local area network ("LAN"), and so forth. In some implementations, the network includes at least one of Ethernet, Wi-Fi® as promulgated by the Wi-Fi® Alliance, 3G and 4G, Bluetooth® as promulgated by the Bluetooth® Special Interest Group, and so forth. The devices and systems described herein may be configured to directly connect to each other. The system 100 may include additional servers which communicate with the media devices 102(D) and the server 104.

The server 104 may communicate with a large number of the media devices 102(D). Accordingly, the server 104 may be a high end computer with large storage capacity, fast microprocessors and high speed network connections. Conversely, relative to a typical server, each media device 102(D) may have less storage capacity, processors and network connections. In some implementations, the server 104 may be referred to as an information processing system or an information processing device. The server 104 is discussed in more detail below with regard to FIG. 2.

As illustrated in FIG. 1, the server 104 is configured to access historical data 110. In this example, the historical data 110 is developed from user account data 112 and device usage data 114(1). The user account data 112 may be representative of user accounts which includes information about the users 106(U). The information about the users 106(U) may include data representative of the user's 106(U) name, address, phone number, and so forth. The user accounts may be described as being associated with the media devices 102(D). For example, in FIG. 1, the first media device 102(1) is associated with a first user account which is associated with the first user 106(1). The second media device 102(2) is associated with a second user account which is associated with the second user 106(2). In some implementations, the user 106(U) may access his or her user account using a user name and password.

In this implementation, device usage data 114(1) is received from the media devices 102(D) and includes content usage data 116, location data 118, and time data 120.

The content usage data 116 may include data which indicates or identifies at least a portion of the content 108 accessed using the plurality of user accounts. For example, the content usage data 116 may indicate that a first user account associated with the user 106(1) has downloaded a song which is titled "MUSIC SONG" and is written by "John Smith". The content usage data 116 may also include data which indicates an amount of content consumed. For example, the content usage data 116 may indicate that user 106(1) reads an average of forty pages of a particular author each day. The content usage data 116 may also include data which indicates content access times in which the particular content is accessed using the plurality of user accounts.

The location data 118 may indicate a latitude and longitude of the media device 102(D). The location data 118 may include data which represents locations in which particular content is accessed using the user accounts. For example, the location data 118 may indicate that the user account associated with the media device 102(D) accessed a particular eBook on the fourth floor of a particular building.

The time data 120 may include data which indicates location times and dates associated with the locations of the media device 102(D). Continuing the example, the time data 120 may indicate that, from 8:00 a.m. to 9:00 a.m. on Apr. 1, 2013, the media device 102(D) was located on the fourth floor of a particular building. The time data 120 may include data which represents content access times in which particular content 108 is accessed using the user account of the media device 102(D). Continuing the example, the time data 120 may indicate that, from 8:15 a.m. to 8:45 a.m. on Apr. 1, 2013, the user account of the media device 102(D) accessed the eBook. The time data 120 may also include power state data which indicates whether the media device 102(D) is in a powered on state.

The device usage data 114 stored or accessed by the server 104 may comprise at least one of the historical content usage data 116, the historical location data 118, or the historical time data 120.

In FIG. 1, the server 104 includes a travel route pattern generation module 122 configured to generate travel route pattern data 124 representative of travel route patterns. The travel route patterns may be described as consistent sequences of geographic points through which the users 106(U) or the media devices 102(D) pass while travelling, for example, by common carrier or public transportation. For example, a particular travel route pattern for a particular user 106(U) may be determined once the particular user 106(U) of a particular media device 102(D) travels on the same train route at least fifteen times within a month. The travel route pattern data 124 may be generated based on the location data 118 stored as the historical data 110 by the server 104. The travel route pattern data 124 may be generated based on the location data 118 and the time data 120 which are stored as the historical data 110. In this implementation, the travel route pattern generation module 122 generates a first travel route pattern associated with the first user account for the first media device 102(1), and a second travel route pattern associated with the second user account for the second media device 102(2).

In FIG. 1, the server 104 includes a correspondence determination module 126 configured to determine whether a particular user account corresponds with one or more other user accounts. In this implementation, the correspondence determination module 126 determines whether a particular user account corresponds to another user account based on the content usage data 116 and the travel route pattern data 124. For example, where travel route patterns indicate that a plurality of the users 106(U) travel on a particular train for a month at the same time, and the content usage data 116 stored in association with the plurality of users 106(U) indicates that each user 106(U) reads the same type of eBooks on the particular train, the correspondence determination module 126 determines that each user account corresponds to each other. In FIG. 1, the correspondence determination module 126 determines that the user account associated with the first user 106(1) corresponds to the user account associated with the second user 106(2) based on the content usage data 116 and the travel route pattern data 124. For example, the first user 106(1) and the second user 106(2) may ride the same train every day at the same time, and play the same games using the first media device 102(1) and the second media device 102(2).

Based on the determination that the user account associated with the first user 106(1) corresponds to the user account associated with the second user 106(2), the correspondence determination module 126 transmits notification data 128(1) to the first media device 102(1), and notification data 128(2) to the second media device 102(2). In this example, the notification data 128 includes data which indicates a determination that the user account associated with the first user 106(1) corresponds to the user account associated with the second user 106(2). For example, where the first user 106(1) and the second user 106(2) have been riding the same train for a month at the same time and reading the same types of eBooks, each media device 102(D) associated the first user 106(1) and the second user 106(2) may display the following message: "There is a person that has been riding the same train as you for the last month and has been reading the same eBook as you. Would you like to be introduced to this person?"

In this implementation, the media devices 102(D) may be configured to present a user interface based on the notification data 128 which enables the users 106(U) to allow or disallow introduction to the one or more other users 106(U).

In FIG. 1, the first media device 102(1) transmits a request for introduction 130(1) to the server 104, indicating that user 106(1) allows introduction to the second user 106(2). The second media device 102(2) transmits a request for introduction 130(2) to the server 104, indicating that second user 106(2) allows introduction to the first user 106(1).

In this implementation, the introduction module 132 is configured to transmit introduction data 134 to the media devices 102(D). In FIG. 1, the introduction module 132 transmits the introduction data 134(1) to the first media device 102(1), and the introduction data 134(2) to the second media device 102(2). The introduction data 134 may include data about the users 106(U). For example, the introduction data 134 may include data representative of a picture of the user 106(U), the user's 106(U) name, the user's 106(U) telephone number, and so forth. The introduction data 134 may be configured to enable the users 106(U) to communicate directly with each other. In some implementations, the introduction data 134 enables the first media device 102(1) and the second media device 102(2) to communicate using text-based messages. For example, the first media device 102(1) may communicate with the second media device 102(2) using at least one of instant messaging, real-time text, short message service, or multimedia messaging service. In some implementations, the introduction data 134 may be configured to obfuscate, conceal or hide identifying information of the users 106(U). For example, a video chat may be initiated without revealing the account name of the respective user accounts, using virtual avatars to conceal actual appearance, and so forth.

Figure 2:
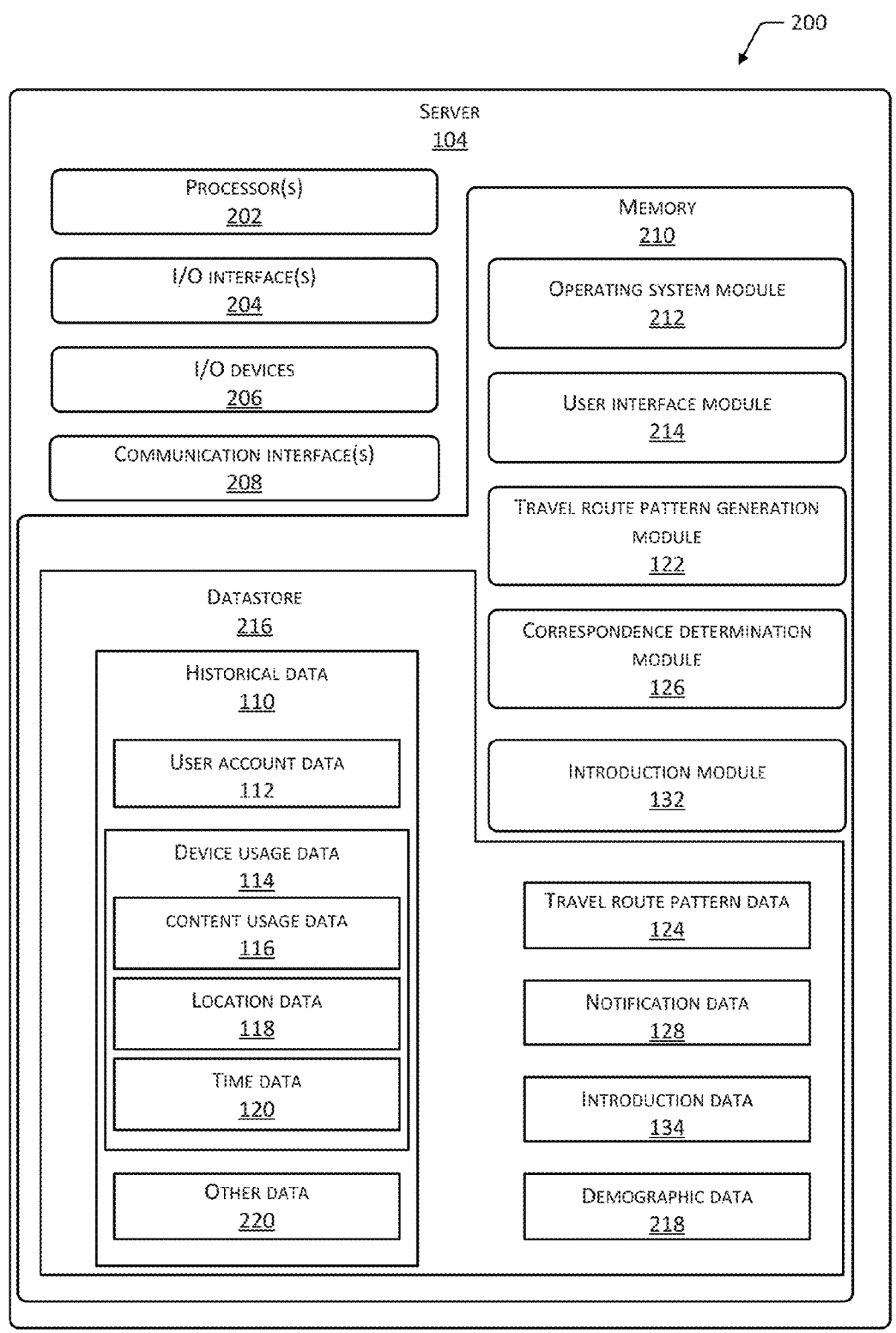
FIG. 2 is a block diagram of a server configured to determine whether a user account corresponds to one or more other user accounts based on the travel route patterns, the historical data of the users, and so forth.

FIG. 2 is a block diagram 200 of the server 104 which is configured to determine whether a user account corresponds to one or more other user accounts based on the travel route patterns, the historical data 110 of the users 106(U), and so forth. The server 104 may include at least one processor 202 configured to execute stored instructions. The at least one processor 202 may comprise one or more cores.

The server 104 includes at least one input/output ("I/O") interface 204 which enables portions of the server 104 (e.g., the processor 202) to communicate with other devices. The I/O interface 204 may include inter-integrated circuit ("I2C"), serial peripheral interface bus ("SPI"), USB, RS-232, HDMI®, TOSLINK®, Bluetooth®, and so forth. The at least one I/O interface 204 may be communicatively coupled to at least one I/O device 206. In some implementations, certain I/O devices 206 are physically incorporated with the server 104 or externally placed.

The server 104 may include at least one communication interface 208. The communication interface 208 may be configured to provide communications between the server 104 and other devices, such as the media device 102(D), routers, access points, other servers, and so forth. The communication interface 208 may connect to the network.

The server 104 may include at least one bus or other internal communications hardware or software that enables for the transfer of data between the various modules and components of the server 104.

As illustrated in FIG. 2, the server 104 may include at least one memory or memory device 210. The memory 210 may include at least one computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules and other data for the operation of the server 104.

The memory 210 may include at least one operating system ("OS") module 212. The OS module 212 may be configured to manage hardware resources such the I/O interface 204, the I/O device 206, the communication interface 208, and provide various services to applications or modules executing on the processor 202. The memory 210 may also store at least one of the following modules which may be executed as foreground applications, background tasks, or daemons.

In some implementations, a user interface module 214 is configured to provide a user interface to the user 106(U) using the I/O devices 206 and to accept inputs received from the I/O devices 206. The user interface may include one or more visual, audible, or haptic elements. For example, the user interface may be configured to provide a graphic user interface, an audible user interface, and so forth.

As discussed above, the travel route pattern generation module 122 may be configured to generate travel route pattern data 124 representative of travel route patterns. The travel route pattern generation module 122 may generate the travel route pattern data 124 based on at least one of the location data 118 or the time data 120. The travel route pattern generation module 122 may be configured to generate the travel route pattern data 124 based on acquiring a threshold quantity of the location data 118. For example, the threshold amount of the location data 118 may be based on a number of days. For example, the server 104 may be configured to require location data 118 associated with at least thirty days of travel before travel route pattern data 124 may be generated. The travel route pattern data 124 may be associated with a day of the week. For example, a travel route pattern for the user 106(U) may be associated with Monday, in which the user 106(U) may travel along the same or a similar route every Monday for one year.

The travel route pattern generation module 122 may be configured to determine a type of transportation used by the user 106(U) based on the location data 118. For example, the travel route pattern generation module 122 may be configured to determine whether the user 106(U) is driving a car, walking, or riding a bicycle. The travel route pattern generation module 122 may be configured to cause the media device 102(D) to sample audio data or video data to determine the location of the user 106(U). For example, the sampled data may be used to determine whether the user 106(U) is located within a train, a bus or a car.

As discussed above, the correspondence determination module 126 may be configured to determine whether a particular user account corresponds with one or more other user accounts. The determination of whether a particular user account corresponds to another user account may be based on the location data 118. The determination of whether a particular user account corresponds to another user account may be based on the content usage data 116 and the travel route pattern data 124. The correspondence determination module 126 may use one or more machine learning techniques to determine the correspondence. For example, the correspondence determination module 126 may implement a neural network, decision tree, and so forth. As discussed in more detail below with regard to FIGS. 7 and 8, the determination of whether a particular user account corresponds to another user account may be based on whether the users 106(U) have a threshold amount of the same characteristics.

The determination of whether a particular user account corresponds to another user account may be based on a threshold amount of time. For example, the determination of whether a particular user account corresponds to another user account may be determined when a threshold amount of time elapses (e.g., three months) and when a threshold amount of the historical data 110 is associated or matches between user accounts. For example, the server 104 may determine particular user accounts correspond to one another once a determination is made that, during the last three months, users 102(U) associated with the particular user accounts listen to the same type of music and ride the same train.

As discussed above, based on the determination that a user account corresponds to another user account, the correspondence determination module 126 transmits the notification data 128 to the media devices 102(D) associated with the corresponding user accounts. The correspondence determination module 126 may transmit the notification data 128 based on whether the media devices 102(D) are within a threshold distance (e.g., ten feet) of each other. In one example, the server 104 may be configured to transmit the notification data 128 to the media devices 102(D) only if the media devices 102(D) are located in the same train car.

As discussed above, the introduction module 132 may be configured to transmit the introduction data 134 to the media devices 102(D). The introduction data 134 may include data about the users 106(U). For example, the introduction data 134 may be representative of a picture of the user 106(U), the user's 106(U) name, the user's 106(U) telephone number, and so forth. The introduction module 132 may be configured to enable users 106(U) to communicate directly with each other. In some implementations, the introduction module 132 enables the users 106(U) to communicate using a real-time transmission of text-based messages.

The introduction module 132 may receive, from the media devices 102(D), requests for introductions. The introduction module 132 may be configured to transmit the introduction data 134 to the media device 102(D) after each request for the introduction is received. Such a configuration allows users 106(U) to prevent his or her information being sent to other users 106(U) if desired.

In some implementations, the memory 210 includes a datastore 216 for storing information. The datastore 216 may use a flat file, database, linked list, tree or other data structure to store the information. In some implementations, the datastore 216, or a portion thereof, may be distributed across at least one other device, such as another server, a network storage device, and so forth. As illustrated in FIG. 2, the datastore 216 may include the historical data 110, the travel route pattern data 124, the notification data 128, the introduction data 134, and demographic data 218.

As shown in FIG. 2, the historical data 110 may include the user account data 112, the device usage data 114, and other data 220. The user account data 112 includes data representative of user accounts which includes information about the users 106(U). The information about the users 106(U) which may include data representative of the user's 106(U) name, address, phone number, and so forth. The user accounts may be associated with the media devices 102(D).

As described above, the content usage data 116 may include data which indicates or identifies particular content accessed by the media devices 102(D). For example, the content usage data 116 may indicate that user 106(1) has downloaded a song which is titled "SONG A" and is written by "John Smith". As described above, the content usage data may indicate content access times in which the content has been consumed using the media device. In some implementations, the content usage data 116 is developed based on content 108 which is streamed from the server 104. In these implementations, the historical content usage 116 accessed by the server 104 may be determined by the server 104.

As described above, the location data 118 may indicate a latitude and longitude of the media device 102(D). The location data 118 may indicate where particular content is accessed by the media device 102(D). The location data 118 may include times associated with the location data 118.

As described above, the time data 120 may include data which indicates location times associated with the locations of the media device 102(D). For example, the time data 120 may indicate that the media device 102(D) is located on a particular train from 8:00 a.m. local time to 9:00 a.m. local time. The time data 120 may include data which represents content access times in which particular content is accessed by the media device 102(D). The time data 120 may also include power state data which indicates whether the media device 102(D) is in a powered on state.

The other data 220 may include at least one of: data indicative of ages of a plurality of users 106(U) associated with the plurality of user accounts; data indicative of content purchased by the plurality of users 106(U); data indicative of web pages visited by the plurality of users 106(U); data indicative of the relationship statuses of the plurality of users 106(U); data indicative of categories of music listened to by the plurality of users 106(U); data indicative of authors which the user 106(U) reads; or data indicative of types of media devices used by the plurality of users 106(U). In some embodiments, the determination of whether a particular user account corresponds to another user account may be based on the other data 220.

As shown in FIG. 2, the datastore 216 may include the travel route pattern data 124 which is representative of travel patterns. As discussed above, the travel patterns may be representative of sequences of geographic points through which the users 106(U) pass while travelling, for example, by common carrier or public transportation.

The notification data 128 may include data indicative of an occurrence of a user account corresponding to one or more other user accounts. The notification data 128 may include data indicative of a date, a time, and a place in which a plurality of users 106(U) are invited to attend. The introduction data 134 may be configured to enable the users 106(U) to communicate directly with each other. In some implementations, the introduction data 134 enables the media devices 102(D) to communicate using a real-time transmission of text-based messages. In some implementations, the introduction data 134 may be configured to obfuscate, conceal, or hide identifying information of the users 106(U). For example, a video chat may be initiated without revealing the account name of the respective user accounts, using virtual avatars to conceal actual appearance, and so forth.

In FIG. 2, the demographic data 218 may include data which may indicate at least one of: the age of the user 106(U); the address of the user 106(U); the gender of the user 106(U); the ethnicity of the user 106(U); the nationality of the user 106(U); the knowledge of languages of the user 106(U); and the employment status of the user 106(U). The demographic data 218 may include data which indicates the relationship status of the user 106(U). For example, the relationship status may indicate that the user 106(U) is single or married.

Figure 3:
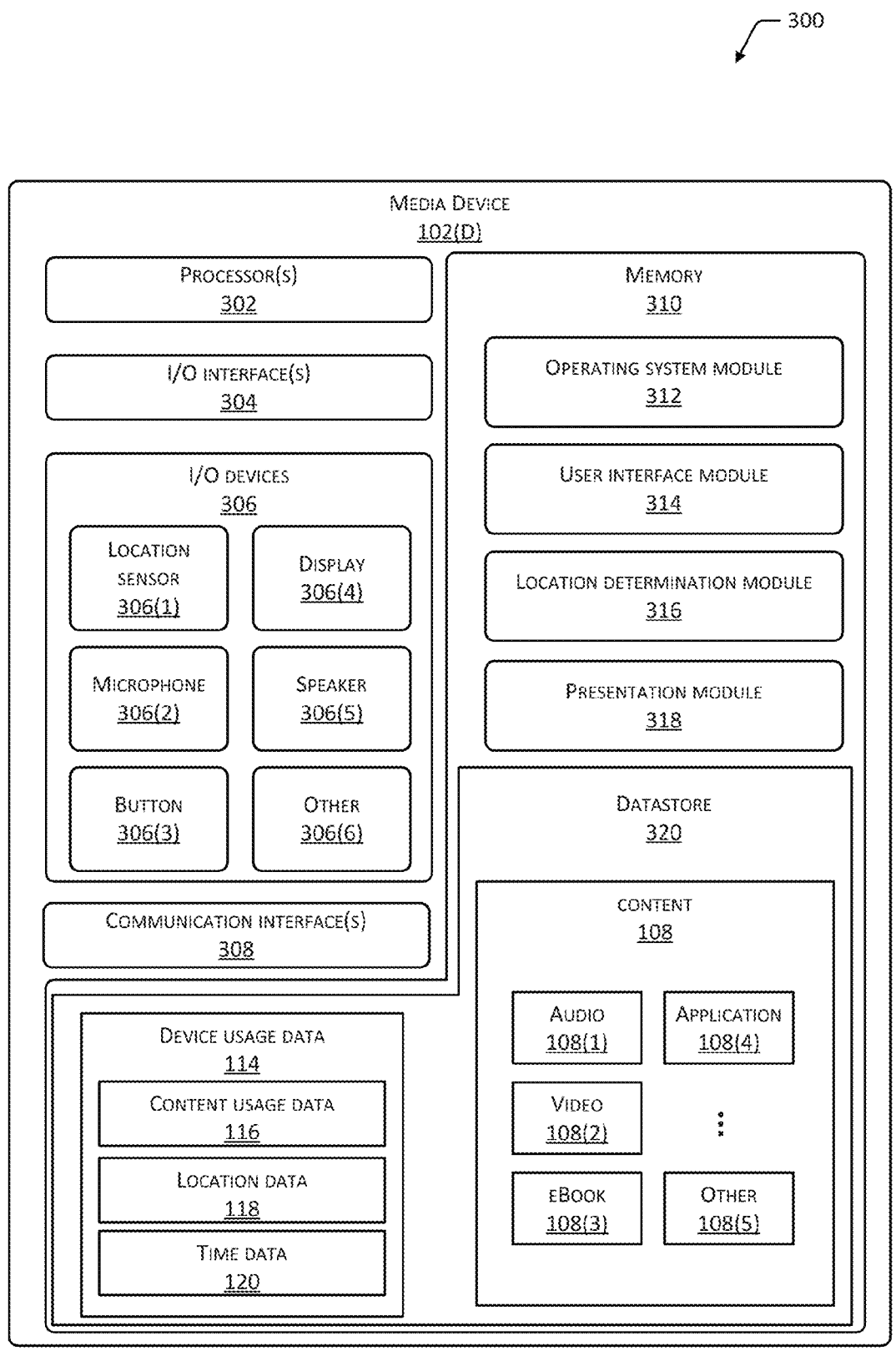
FIG. 3 is a block diagram of a media device configured to present data representative of an introduction between users.

FIG. 3 is a block diagram 300 of the media device 102(D) which is configured to present data representative of an introduction between users 106(U). The media device 102(D) may include at least one processor 302 configured to execute stored instructions. The at least one processor 302 may comprise one or more cores.

The media device 102(D) includes at least one I/O interface 304 which enables portions of the media device 102(D) (e.g., the processor 302) to communicate with other devices. The I/O interface 304 may include inter-integrated circuit ("I2C"), serial peripheral interface bus ("SPI"), USB, RS-232, HDMI®, TOSLINK®, Bluetooth®, and so forth. The at least one I/O interface 304 may be communicatively coupled to at least one I/O device 306. In some implementations, certain I/O devices 306 are physically incorporated with the media device 102(D) or externally placed.

As illustrated in FIG. 3, the at least one I/O device 306 may include one or more input devices such as location sensors 306(1), a microphone 306(2), and a button 306(3). The location sensor 306(1) may include an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a GLONASS (Global Navigation Satellite System) receiver, a Galileo receiver, an Indian Regional Navigational Satellite System, and so forth. The I/O device 306 may include one or more of a variety of output devices such as a display 306(4), a speaker 306(5) and other I/O devices 306(6). The one or more display devices 306(4) may include electrophoretic displays, liquid crystal displays, interferometric displays, cholesteric displays, light emitting diode displays, projection displays, and so forth. The other I/O devices 306(6) may include a camera, a touch sensor and a haptic output device.

The media device 102(D) may include at least one communication interface 308. The communication interface 308 may be configured to provide communications between the media device 102(D) and other devices, such as the server 104, routers, access points, other servers, other media devices 102(D) and so forth. The communication interface 308 may connect to the network.

The media device 102(D) may include at least one bus or other internal communications hardware or software that enables for the transfer of data between the various modules and components of the media device 102(D).

As illustrated in FIG. 3, the media device 102(D) may include at least one memory or memory device 310. The memory 310 may include at least one computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules and other data for the operation of the media device 102(D).

The memory 310 may include at least one operating system ("OS") module 312. The OS module 312 may be configured to manage hardware resources such the I/O interface 304, the I/O device 306, the communication interface 308, and provide various services to applications or modules executing on the processor 302. The memory 310 may also store at least one of the following modules which may be executed as foreground applications, background tasks, daemons, and so forth.

In some implementations, a user interface module 314 is configured to provide a user interface to the user 120(U) using the I/O devices 306 and to accept inputs received from the I/O devices 306. The user interface may include one or more visual, audible, or haptic elements. For example, the user interface may be configured to provide a graphic user interface, an audible user interface, and so forth.

In FIG. 3, the location determination module 316 is configured to provide the location data 118 of the media device 102(D) based at least in part on information received from the one or more location sensors 306(1). The location data 118 may include any suitable data indicative of the location of the media device 102(D). The location data 118 may represent the latitude and longitude of the media device 102(D), relative position such as "conference hall A", and so forth.

The presentation module 318 is configured to present the content 108. The presentation module 318 may be configured to present the content 108 using one or more of the display device 306(4), the speaker 306(5), and so forth. For example, the presentation may include displaying the content 108 using the display device 306(4). The presentation module 318 may be configured to present the notification data 128 and the introduction data 134. The presentation module 318 may be configured to present a user interface based on the notification data 128 which enables the users 106(U) to allow or disallow introduction to the one or more other users 106(U).

In some implementations, the memory 310 includes a datastore 320 for storing information. The datastore 320 may use a flat file, database, linked list, tree or other data structure to store the information. In some implementations, the datastore 320, or a portion thereof, may be distributed across at least one other device, such as a server, a network storage device, and so forth. As illustrated in FIG. 3, the datastore 320 may include the device usage data 114 and the content data 108. The content data 108 may include audio data 108(1), video data 108(2), eBook data 108(3), application data 108(4), and other data 108(5).

Illustrative Scenarios and Processes

Figure 4:
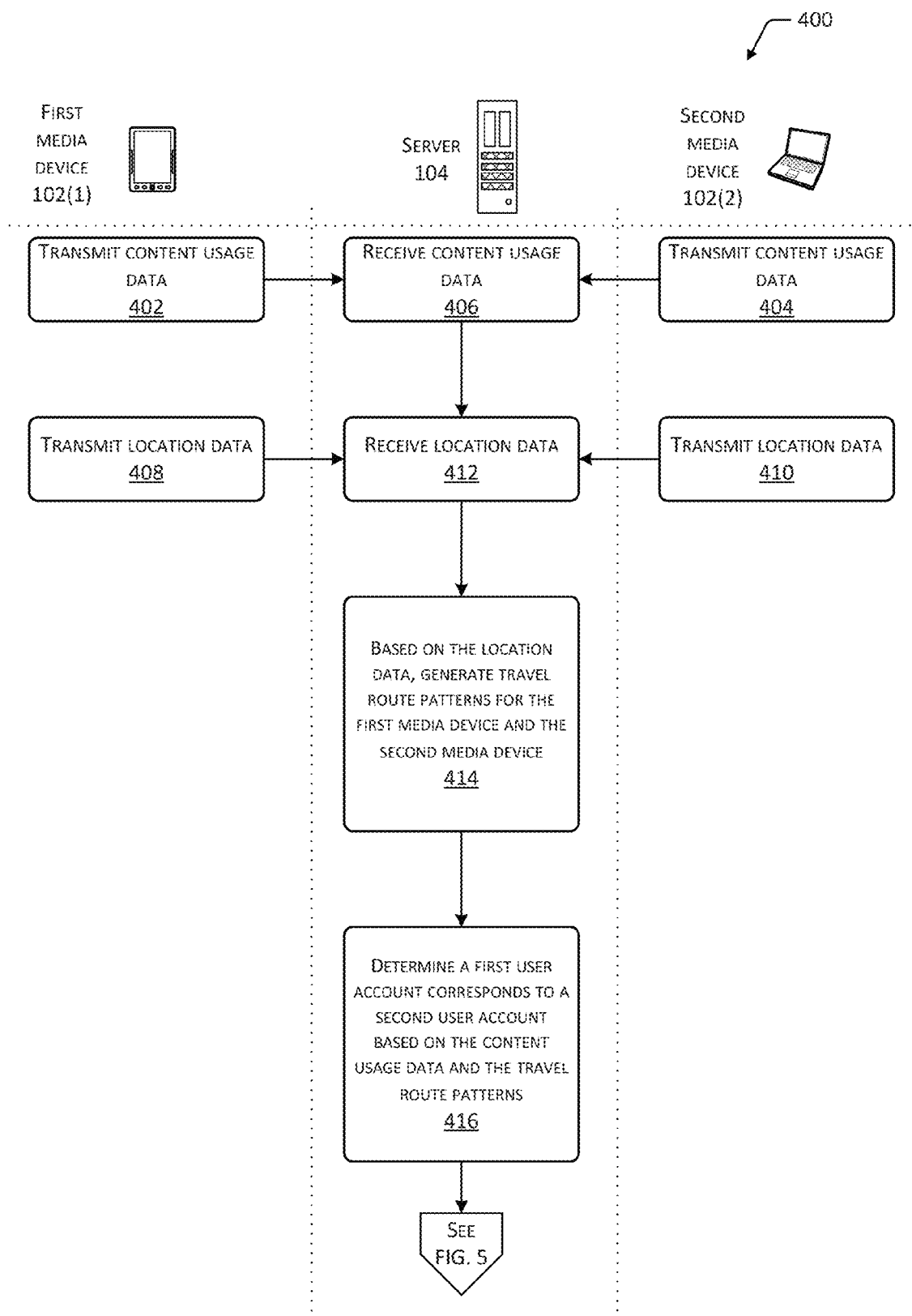
FIGS. 4 and 5 depict a flow diagram illustrating a process of presenting an introduction based on travel route patterns and historical data.

FIG. 4 is flowchart illustrating an example process 400 of presenting an introduction based on travel route patterns and the historical data 110, using the first media device 102(1), the second media device 102(2) and the server 104. Although the process 400 is described with reference to the flowchart illustrated in FIG. 4, many other methods performing the acts associated with the process 400 may be used. For example, the order of many of the steps may be changed, some of the steps described may be optional, and additional steps may be included.

At block 402, the first media device 102(1) transmits the content usage data 116 to the server 104. At block 404, the second media device 102(2) transmits the content usage data 116. In this implementation, the content usage data 116 includes data indicative of particular content accessed using a first user account associated with the first media device 102(1) and a second user account associated with the second media device 102(2). In this implementation, the content usage data 116 also includes data indicative of content access times in which the particular content is accessed using the first media device 102(1) and the second media device 102(2). At block 406, the server 104 receives the content usage data 116 from the first media device 102(1) and the second media device 102(2).

At block 408, the first media device 102(1) transmits the location data 118. At block 410, the second media device 102(2) transmits the location data 118. In this implementation, the location data 118 is representative of locations of the first media device 102(1) and the second media device 102(2). The location data 118 may represent times associated with the locations of the first media device 102(1) and the second media device 102(2). The location data 118 may represent locations at which the particular content 108 is accessed by the first media device 102(1) and the second media device 102(2). At block 412, the server 104 receives the location data 118 from the first media device 102(1) and the second media device 102(2).

At block 414, the server 104 generates the travel route pattern data 124 based on the location data 118 and the time data 120 for a first user account and a second user account. At block 416, the server 104 determines the first user account corresponds to the second user account based on the content usage data 116 and the travel route pattern data 124. In one example, the server 104 determines the first user account corresponds to the second user account when a threshold amount of the historical data 110 associated with the first user account and the second user account are the same or similar. For example, the server 104 may determine that the first user account corresponds to the second user account if, for the last 4 months, the first user 106(1) associated with the first user account and the second user 106(2) associated with the second user account have been travelling along the same walking path and listing to science fiction books with their media devices 102(D). In another example, the server 104 may determine that the first user account corresponds to the second user account when a certain percentage of the device usage data 114(1) transmitted from the first media device 102(1) is similar to the device usage data 114(3) received from the second media device 102(2). For example, the first user 106(1) and the second user 106(2) may commute to work on the same train each morning. In this example, the first user 106(1) may use the first media device 102(1) to read science fiction books 60% of the time the first user 106(1) uses the first media device 102(1), and the second user 106(2) may use the second media device 102(2) to read science fiction books 55% of the time the second user 106(2) uses the second media device 102(2). In this example, because each of the users 106(1) and 106(2) use their media devices 102(1) and 102(2) at least 50% of the time to read science fiction books on the same train, the server 104 determines that the first user account corresponds to the second user account.

In some implementations, the server 104 determines a correspondence of the first user account and the second user account using various graph matching or graph comparison techniques. For example, for each user 106(U), the content usage data 116 and the travel route pattern data 124 may be represented or expressed as a graph. The server 104 may be configured to perform various graph matching or graph comparison techniques to the graphs for each user 106(U) to determine whether user accounts correspond to one another.

In some implementations, the server 104 determines a correspondence of the first user account and the second user account based on a weighted statistical analysis. For example, the server 104 may assign different weight values to matching content usage data 116 and matching travel route pattern data 124. In one example, the first user 106(1) and the second user 106(2) travel on the same travel route every day for three months, however, an analysis of the similarities of the content usage data 116 for the first user 106(1) and the second user 106(2) indicates that not much of the same content is consumed by the first user 106(1) and the second user 106(2). Nonetheless, in this example, the server 104 may determine a correspondence of the first user account and the second user account because of a weighted value assigned to the matching travel routes.

In some implementations, the server 104 determines a correspondence of the first user account and the second user account using machine learning algorithms, heuristic algorithms, or pattern recognition algorithms.

Figure 5:
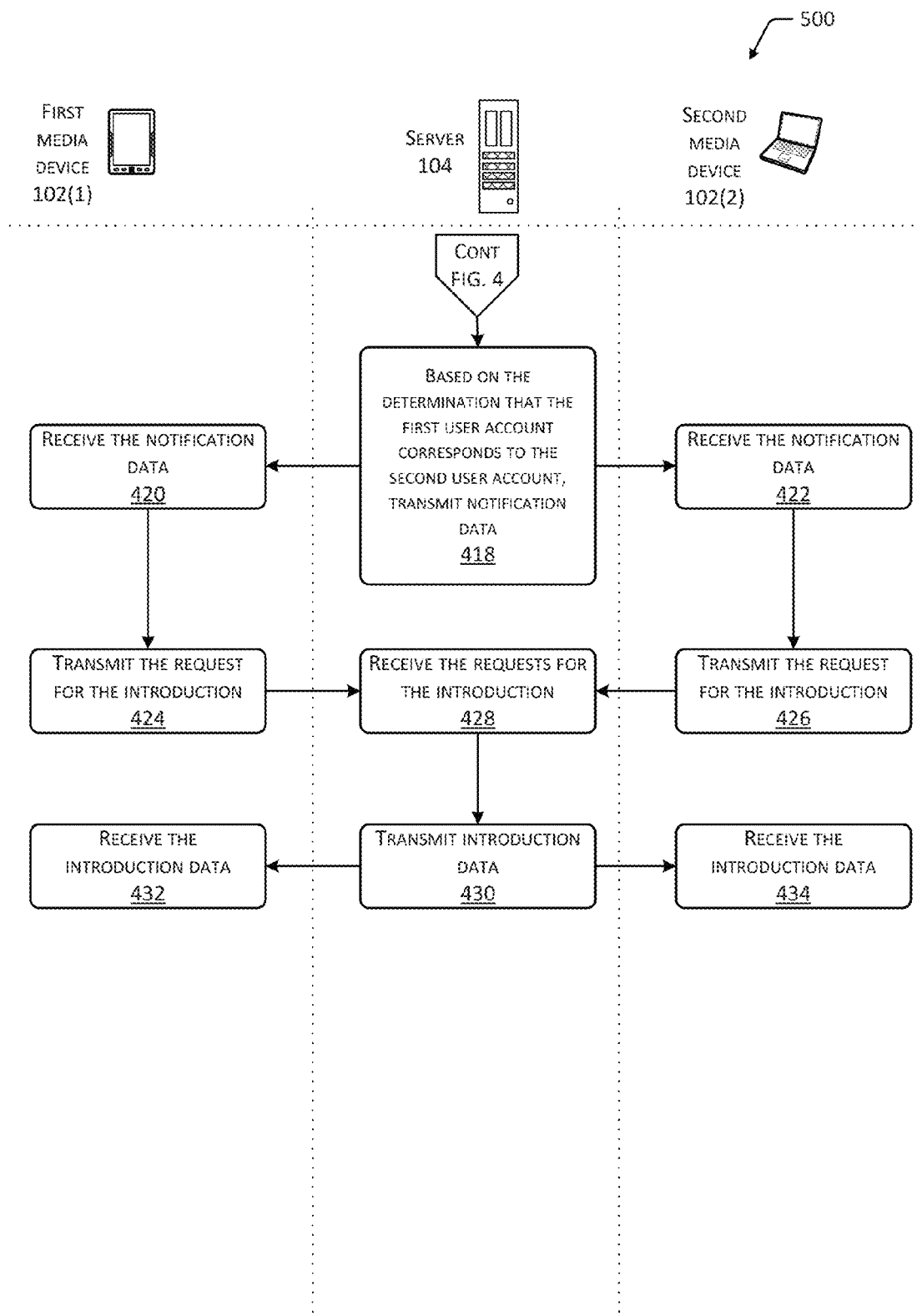

Referring to FIG. 5, example process 500 is a continuation of the process 400. At block 418, based on the determination that the first user account corresponds to the second user account, the server 104 transmits the notification data 128. At block 420, the first media device 102(1) receives the notification data 128. At block 422, the second media device 102(2) receives the notification data 128.

At block 424, the first media device 102(1) transmits the request for the introduction 130. At block 426, the second media device 102(2) transmits the request for the introduction 130. At block 428, the server 104 receives the requests for the introduction 130. The server 104 may be configured to verify that the media devices 102(D) which sent the requests for the introduction are the correct media devices 102(D).

At block 430, the server 104 transmits the introduction data 134. At block 432, the first media device 102(1) receives the introduction data 134. At block 434, the second media device 102(2) receives the introduction data 134.

Figure 6:
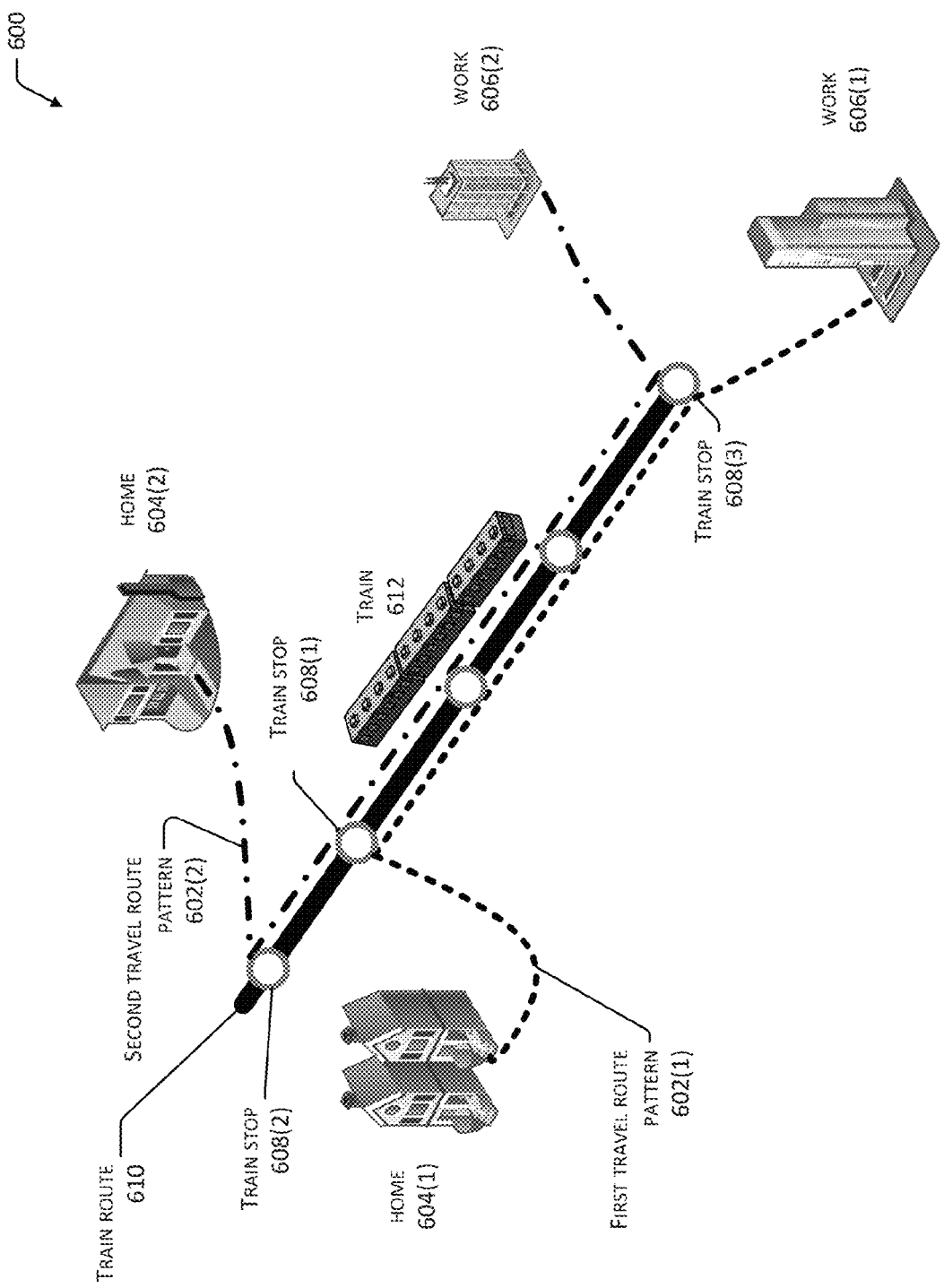
FIG. 6 illustrates example travel route patterns associated with user accounts.

FIG. 6 is a schematic diagram 600 illustrating example travel route patterns 602 associated with user accounts. The schematic diagram 600 illustrates a first travel route pattern 602(1) associated with the first user 106(1) and a second travel route pattern 602(2) associated with the second user 106(2). The first travel route pattern 602(1) is representative of sequences of geographic points through which the first user 106(1) passes while travelling from the first user's home 604(1) to the first user's work 606(1). More specifically, in this example, the first user 106(1) walks from the home 604(1) to the train stop 608(1) of the train route 610. The first user 106(1) then rides the train 612 until the train stop 608(3). The first user 106(1) then walks from the train stop 608(3) to the work 606(1).

The second travel route pattern 602(2) is representative of sequences of geographic points through which the second user 106(2) passes while travelling from the second user's home 604(2) to the second user's work 606(2). More specifically, in this example, the second user 106(2) walks from the home 604(2) to the train stop 608(2) of the train route 610. The second user 106(2) then rides the train 612 until the train stop 608(3). The second user 106(2) then walks from the train stop 608(3) to the work 606(2).

Figure 7:
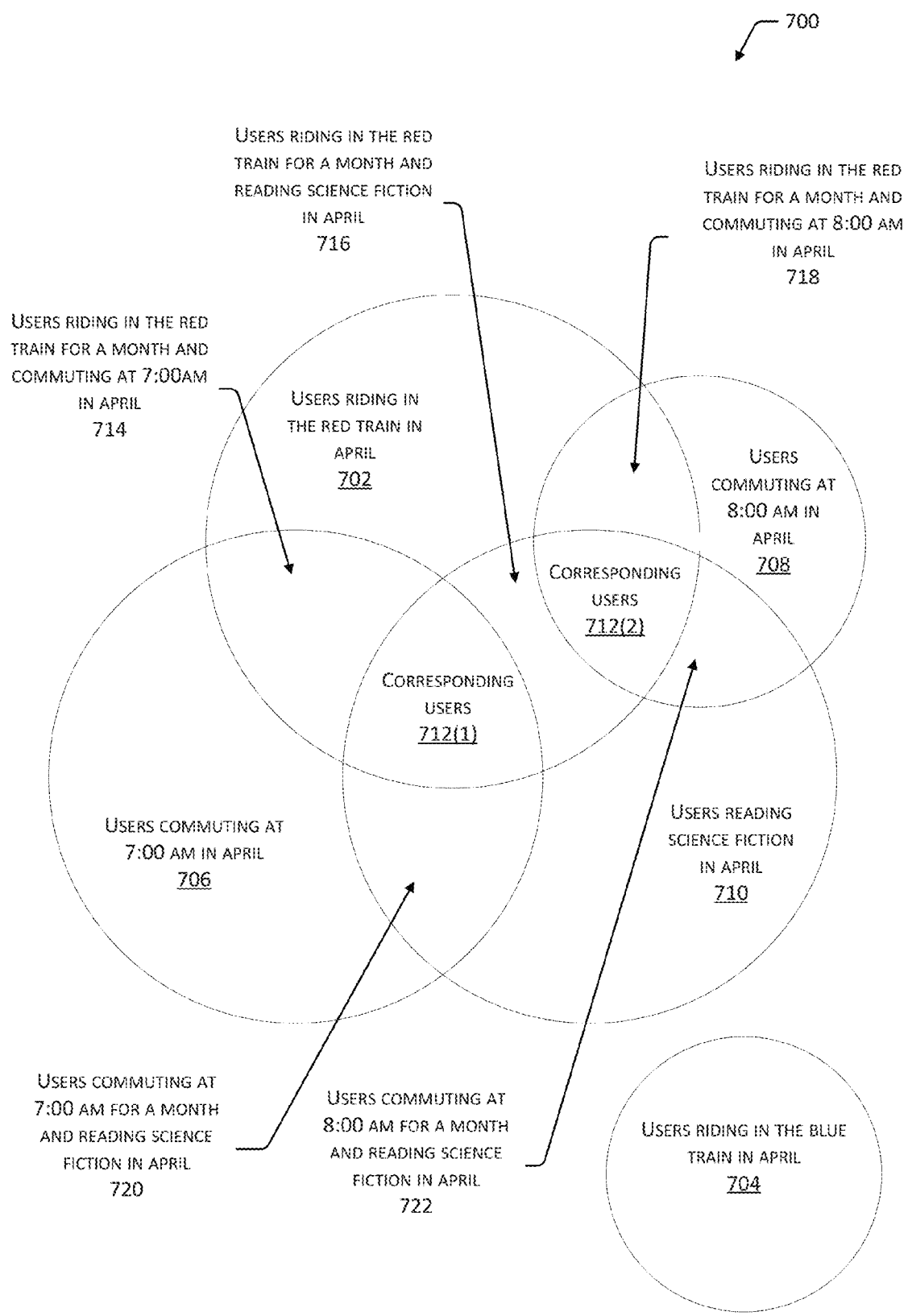
FIGS. 7 and 8 are Venn diagrams, illustrating correspondence between users based on content and travel route patterns.

FIG. 7 is a Venn diagram 700, illustrating examples of correspondences between users 106(U) based on particular content usage and travel route patterns. Section 702 represents users 106(U) riding in the red train during the month of April. Section 704 represents users 106(U) riding in the blue train in the month of April. Section 706 represents users 106(U) commuting at 7:00 a.m. in April. Users 106(U) commuting at a specific time (e.g., 7:00 a.m.) may be described as users 106(U) that are in transit at the specific time. Section 708 represents users 106(U) commuting at 8:00 a.m. in April. Section 710 represents users 106(U) reading science fiction in April.

Continuing with the example, section 714 represents users 106(U) riding in the red train in April and commuting at 7:00 a.m. in April. Section 716 represents users 106(U) riding in the red train in April and reading science fiction in April. Section 718 represents users 106(U) riding in the red train in April and commuting at 8:00 a.m. in April. Section 720 represents users 106(U) commuting at 7:00 a.m. in April and reading science fiction in April. Section 722 represents users 106(U) commuting at 8:00 a.m. in April and reading science fiction in April.

Sections 712(1) and 712(2) represent corresponding users 106(U). In this illustration, a user 106(U) corresponds with another user 106(U) based on whether a threshold quantity or number of characteristics are associated or matches between user accounts which are associated with the users 106(U). In this example, the threshold quantity is three. In other examples, the threshold quantity may be another number, such as ten. The corresponding users 106(U) in section 712(1) are determined to correspond because each user 106(U) in section 712(1) has the following three characteristics: 1) the users 106(U) ride the red train in April; 2) the users 106(U) commute at 7:00 a.m. in April; and 3) the users 106(U) read science fiction in April. The corresponding users 106(U) in section 712(2) are determined to correspond because each user 106(U) in section 712(2) has the following three characteristics: 1) the users 106(U) ride the red train in April; 2) the users 106(U) commute at 8:00 a.m. in April; and 3) the users 106(U) read science fiction in April.

In this example, the server 104 is configured to transmit the notification data 128 to each of the media devices 102(D) associated with the corresponding users 106(U) of section 712(1), indicating the correspondence. The notification data 128 may enable the users 106(U) of section 712(1) to interact in a face-to-face manner with one another on the red train during the commute at 7:00 a.m., and provides an indication of a similar interest (i.e., the interest in science fiction). Such face-to-face interaction may make the commute to work more enjoyable, and allow the users 106(U) to broaden their social networks while at a time and place which they were already going to be at. Similarly, the server 104 is configured to transmit the notification data 128 to each of the media devices 102(D) associated with the corresponding users 106(U) of section 712(2), indicating the correspondence. This notification may enable the users 106(U) of section 712(2) to interact in a face-to-face manner with one another on the red train during the commute at 8:00 a.m., while providing the indication that the users 106(U) have a similar interest (i.e., the interest in science fiction).

Figure 8:
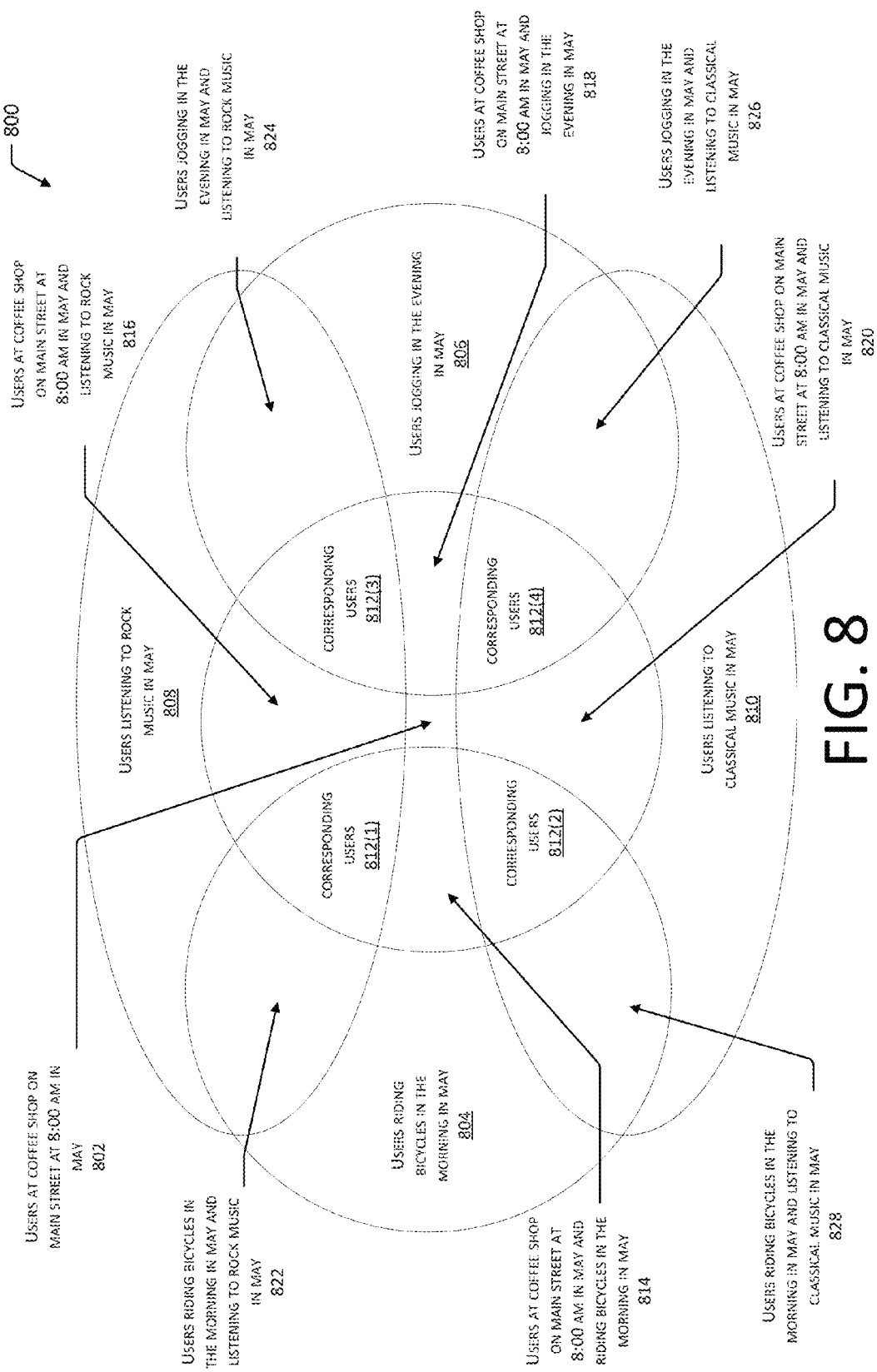

FIG. 8 is a Venn diagram 800, illustrating examples of users 106(U) corresponding based on the time data 120, particular content accessed by the media devices 102(D), and travel route pattern data 124. Section 802 represents users 106(U) that are located at the coffee shop on Main Street at 8:00 a.m. during the month of May. Section 804 represents users 106(U) riding bicycles in the morning in May. Section 806 represents users 106(U) jogging in the evening in May. Section 808 represents users 106(U) listening to rock music in May. Section 810 represents users 106(U) listening to classical music in May.

Continuing with the example, section 814 represents users 106(U) at the coffee shop on Main Street at 8:00 a.m. in May that ride bicycles in the morning in May. Section 816 represents users 106(U) at the coffee shop on Main Street at 8:00 a.m. in May that listen to rock music in May. Section 818 represents users 106(U) at the coffee shop on Main Street at 8:00 a.m. in May and that jog in the evening in May. Section 820 represents the users 106(U) at the coffee shop on Main Street at 8:00 a.m. in May and that listen to classical music in May. Section 822 represents users 106(U) riding bicycles in the morning in May and that listen to rock music in May. Section 824 represents users 106(U) jogging in the evening in May and listening to rock music in May. Section 826 represents users 106(U) jogging in the evening in May and listening to classical music in May. Section 828 represents users 106(U) riding bicycles in the morning in May and listening to classical music in May.

Sections 812(1), 812(2), 812(3) and 812(4) represent corresponding users 106(U). In this example, users 106(U) correspond with other users 106(U) based on the time data 120 which is associated with a particular activity. In this example, the time data 120 indicates that some the users 106(U) ride bicycles in the morning, and that some of the users 106(U) jog in the evening. In this example, a user 106(U) corresponds with another user 106(U) based on whether a threshold quantity or number of characteristics are associated or matches between user accounts which are associated with the users 106(U). In FIG. 8, the corresponding users 106(U) of section 812(1) are determined to correspond because each user 106(U) in section 812(1) has the following three characteristics: 1) the users 106(U) are at the coffee shop on Main Street at 8:00 a.m. in May; 2) the users 106(U) ride bicycles in the morning in May; and 3) the users 106(U) listen to rock music in May. The corresponding users 106(U) of section 812(2) are determined to correspond because each user 106(U) in section 812(2) has the following three characteristics: 1) the users are at the coffee shop on Main Street at 8:00 a.m. in May; 2) the users 106(U) ride bicycles in the morning in May; and 3) the users listen to classical music in May. The corresponding users 106(U) of section 812(3) are determined to correspond because each user 106(U) in section 812(3) has the following three characteristics: 1) the users 106(U) are at the coffee shop on Main Street at 8:00 a.m. in May; 2) the users 106(U) jog in the evening in May; and 3) the users listen to rock music in May. The corresponding users 106(U) of section 812(4) are determined to correspond because each user 106(U) in section 812(4) has the following three characteristics: 1) the users are at the coffee shop on Main Street at 8:00 a.m. in May; 2) the users jog in the evening in May; and 3) the users listen to classical music in May.

In this example, for each section of corresponding users 106(U), the server 104 is configured to transmit the notification data 128 to each of the media devices 102(D) associated with the corresponding users 106(U), indicating the correspondence. The notification 128 may enable the users 106(U) of section 812(1) to interact in a face-to-face manner with one another at the coffee shop on Main Street at 8:00 a.m., while providing an indication of similar interests (i.e., the interest in riding bicycles in the morning and listing to rock music). The notification 128 may enable the users 106(U) of section 812(2) to interact in a face-to-face manner with one another at the coffee shop on Main Street at 8:00 a.m., providing an indication of the similar interests of riding bicycles in the morning and listing to classical music. The notification 128 may enable the users 106(U) of section 812(3) to interact in a face-to-face manner with one another at the coffee shop on Main Street at 8:00 a.m., providing an indication of the similar interests of jogging in the evening and listing to rock music. The notification 128 may enable the users 106(U) of section 812(4) to interact in a face-to-face manner with one another at the coffee shop on Main Street at 8:00 a.m., providing an indication of the similar interests of jogging in the evening and listing to classical music.

Figure 9:
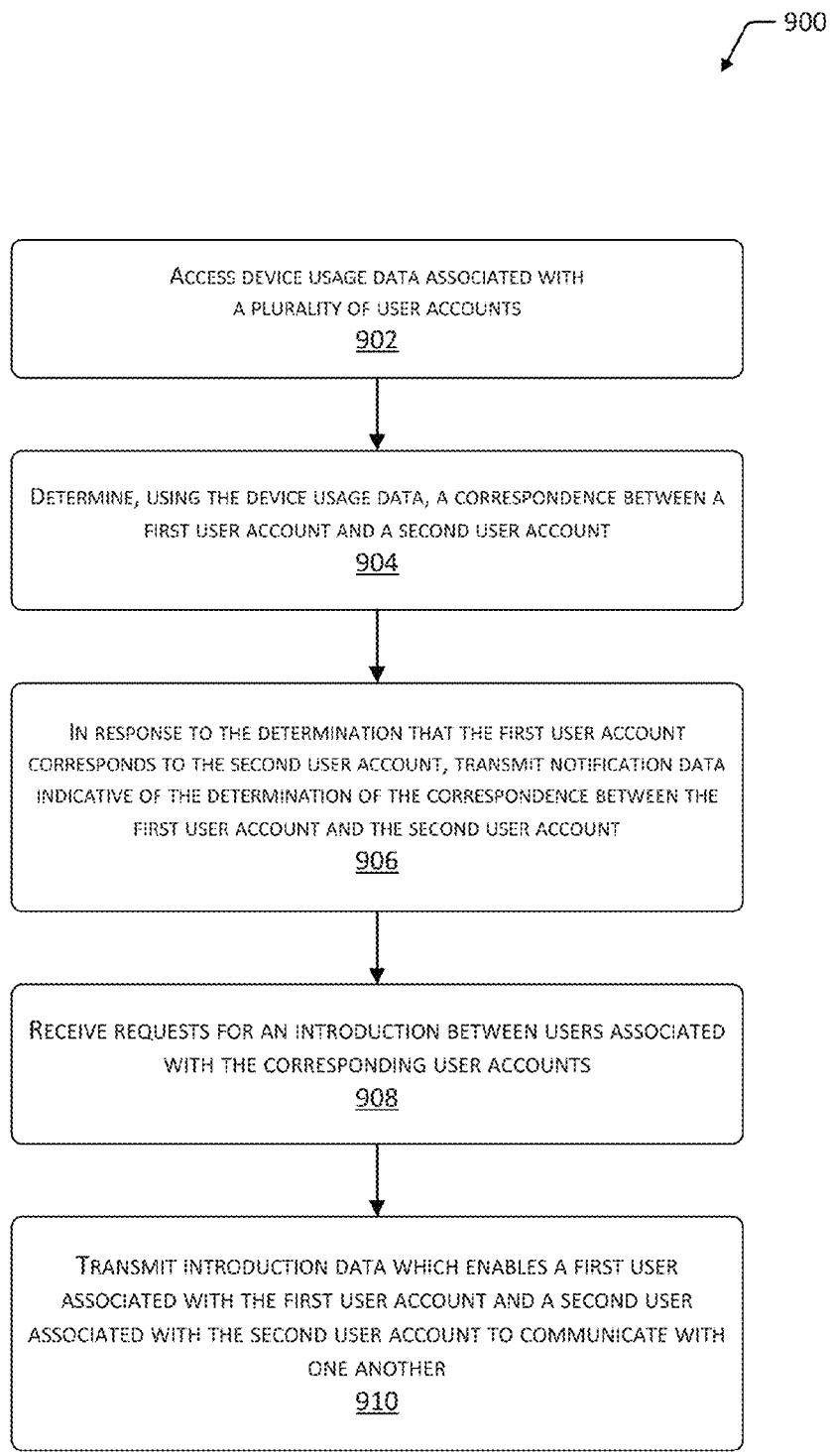
FIG. 9 is a flowchart illustrating a process of presenting an introduction based on historical data.

FIG. 9 is a flowchart illustrating an example process 900 of presenting an introduction based on the historical location data 118, using the server 104. Although the process 900 is described with reference to the flowchart illustrated in FIG. 9, many other methods performing the acts associated with the process 900 may be used. For example, the order of many of the steps may be changed, some of the steps described may be optional, and additional steps may be included.

At block 902, the server 104 accesses the device usage data 114 which is associated with a plurality of the user accounts. The device usage data 114 may be acquired from media devices 102(D) associated with the plurality of user accounts. As discussed above, the device usage data 114 may comprise historical usage data 114 including at least one of the historical content usage data 116, the historical location data 118, or the historical time data 120. The historical location data 118 may represent latitudes and longitudes of the media devices 102(D). The historical location data 118 may indicate locations in which particular content 108 is accessed by the media devices 102(D). The historical location data 118 may indicate location times associated with the locations of the media devices 102(D). For example, the location data 118 may indicate that a particular media 120(D) is located on a particular bike trail from 5:00 p.m. local time to 6:00 p.m. local time. The historical location data 118 may indicate locations such as floors of buildings associated with the locations of the users 106(U). The historical device usage data 114 may include data representative at least one of: content 108 purchased by the plurality of users 106(U); web pages visited by the plurality of users 106(U); categories of music listened to by the plurality of users 106(U); or types of media devices used by the plurality of users 106(U).

At block 904, based on the device usage data 114, the server 104 determines a correspondence between a first user account and a second user account. In some implementations, the determination of the correspondence is based on the travel route pattern data 124 which may be generated based on the at least one of the location data 118 and the time data 120. The travel route pattern data 124 may indicate consistent sequences of geographic points through which the first user 106(1) and the second user 106(2) pass while travelling by common carrier or public transportation. The travel route patterns may be determined after a threshold amount of historical data 110 is acquired, and may be associated with a day of the week.

In one example, the server 104 generates a first travel route pattern associated with a first user account which is associated with the first user 106(1), and a second travel route pattern associated with a second user account which is associated with the second user 106(2). In this example, the server 104 may determine that the first user account corresponds to the second user account based on the historical content usage data 116, the first travel route pattern associated with the first user 106(1), and the second travel route pattern associated with the second user 106(2).

The determination that the first user account corresponds to the second user account may be based on the historical content usage data 116 which indicates particular content accessed using the user accounts. The historical content usage data 116 may also include data indicative of content access times in which the particular content is accessed by the media devices 102(D). In some implementations, the determination that the first user account corresponds to the second user account is further based on the other data 220 which may include data indicative of at least one of: ages of a plurality of users 106(U) associated with the user accounts; content 108 purchased by the plurality of users 106(U); web pages visited by the plurality of users 106(U); relationship statuses of the plurality of users 106(U); categories of music listened to by the plurality of users 106(U); or types of media devices 102(D) used by the plurality of users 106(U). In some implementations, the determination that the first user account corresponds to the second user account may be based on a threshold amount of characteristics being associated or matching between the first user 106(1) and the second user 106(2). In some implementations, the determination that the first user account corresponds to the second user account may occur after a threshold amount of time elapses.

The determination that the first user account corresponds to the second user account may be based on the historical time data 120. The historical time data 120 may include power state data which indicates the time in which the media device is powered on or off. The historical time data 120 may indicate times associated with the locations of the media device 102(D). The historical time data 120 may include data which indicates content 108 access times in which the particular content 108 is accessed by the media device 102(D).

The determination that the first user account corresponds to the second user account may be based on a first travel route pattern associated with the first user 106(1) corresponding to a second travel route pattern associated with the second user 106(2). In one example, the first travel route pattern may correspond to the second travel route pattern if a threshold amount of the first and second travel routes overlap one another. For example, the first travel route pattern and the second travel route pattern may correspond if at least one mile of the travel route patterns overlap one another. In one example, travel route patterns overlap when at least one portion of the travel route patterns coincide with one another. In another example, the travel route patterns may overlap one another when the travel route patterns pass through the same locations at the same times.

In some implementations, a corresponding user account may be associated with users 106(U) of other systems or user accounts which are entered into a database of the server 104.

At block 906, based on the determination that the first user account corresponds to the second user account, the server 104 transmits the notification data 128 indicating the determination that the first user account corresponds to the second user account. The notification data 128 may indicate a date, a time, and a place in which a plurality of the users 106(U) are invited to attend. In some implementations, the server 104 is configured to transmit the notification data 128 when the media devices 102(D) associated with the corresponding user accounts are located within a threshold distance of one another. For example, the media device 102(D) may need to be located within fifty feet of one another before the server 104 transmits the notification data 128 to the media devices 102(D).

At block 908, the server 104 receives requests for an introduction between users associated with the corresponding user accounts. For example, the first media device 102(1) may transmit the request for introduction 130(1) to the server 104, and the second media device 102(2) may transmit the request for introduction 130(2) to the server 104.

At block 910, the server 104 transmits the introduction data 134 which enables a first user 106(1) associated with the first user account and a second user 106(2) associated with the second user account to communicate with one another. For example, the server 104 may transmit the introduction data 134 to the first media device 102(1) and the second media device 102(2). In some implementations, this communication may be configured to obfuscate, omit, conceal or hide identifying information of the users 106(U). For example, a video chat may be initiated without revealing the account name of the respective user accounts, using virtual avatars to conceal actual appearance, and so forth. The first user account may correspond to a plurality of user accounts. In one example, where the first user account corresponds to a plurality of user accounts, the notification data 128 may be configured to cause the first media device 102(1) to display the following message: "There are five people riding the same train as you for the last month and they read the same authors as you. Would you like to be introduced to these people?" In this way, users 106(U) may begin to build and reinforce localized social networks with other users 106(U). The server 104 may transmit the introduction data 134 in response to receiving the request for the introduction from the media devices 102(D).

In some implementations, the media devices 102(D) are configured to present introductions to one another, without using the server 104. For example, the media devices 102(D) may communicate with one another using a peer-to-peer (P2P) network. In some implementations, the first media device 102(1) may send a request to the second media device 102(2) to access the historical content usage data 116 associated with the second media device 102(2), the historical location data 118 associated with the second media device 102(2), and the historical time data 120 associated with the second media device 102(2). The second user 106(2) of the second media device 102(2) may then decide whether to enable the first media device 102(1) to access the historical data of the second media device 102(2). After the second media device 102(2) enables the first media device 102(1) to access the historical data of the second media device 102(2), using the accessed data from the second media device 102(2), the first media device 102(1) may determine whether the first user account associated with the first media 102(1) corresponds to the second user account associated with the second media device 102(2). In response to a determination that the first user account corresponds to the second user account, the first media device 102(1) may transmit the notification data 128 to the second media device 102(2). In response to receiving the request for introduction 130 from the second media device 120(2), the first media device 102(1) may transmit the introduction data 134 which enables the first user 106(1) associated with the first media device 102(1) and the second user 106(2) associated with the second media device 102(2) to communicate with one another.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A server comprising:
   a processor; and
   a memory device coupled to the processor, the memory device storing instructions, which when executed by the processor, cause the processor to:
   access historical content usage data which includes:
   data indicative of content accessed using a plurality of user accounts including a first user account and a second user account; and
   data indicative of content access times at which the content is accessed using the plurality of user accounts;
   access historical location data which includes:
   data indicative of first locations of a first media device associated with the first user account and second locations of a second media device associated with the second user account;
   data indicative of first location times associated with the first locations of the first media device and second location times associated with the second locations of the second media device; and
   data indicative of one or more locations at which the content is accessed by the first media device and one or more locations at which the content is accessed by the second media device;

generate, using the historical location data, a first travel route pattern for the first media device and a second travel route pattern for the second media device, wherein the travel route patterns indicate consistent sequences of geographic locations through which a first user associated with the first user account and a second user associated with the second user account pass while travelling by a specific type of public transportation;

using the historical content usage data, the first travel route pattern and the second travel route pattern, determine a correspondence of the first user account with the second user account;

in response to the determination that the first user account corresponds to the second user account:
 transmit first notification data to the first media device, the first notification data indicating the determination that the first user account corresponds to the second user account; and
 transmit second notification data to the second media device, the second notification data indicating the determination that the first user account corresponds to the second user account;

receive, from the first media device, a first request for an introduction between the first user associated with the first user account and the second user associated with the second user account;

receive, from the second media device, a second request for the introduction between the first user associated with the first user account and the second user associated with the second user account; and responsive to receiving the first request for the introduction and the second request for the introduction:
 transmit, to the first media device, first introduction data configured to enable the first user to communicate with the second user; and
 transmit, to the second media device, second introduction data configured to enable the second user to communicate with the first user.

2. The server of claim 1, wherein:
the transmission of the first notification data and the second notification data is performed when the first media device and the second media device are located within a threshold distance of one another; and
the first introduction data and the second introduction data enable the first media device and the second media device to communicate using a transmission of text-based messages.

3. The system of claim 1, wherein the specific type of transportation includes one or more of on foot, bicycle, automobile, common carrier, or public transportation.

4. The server of claim 1, wherein the content includes one or more of audio data, video data, electronic book data, application data, or game data.

5. A computer-implemented method performed at least in part by a server, the method comprising:
accessing device usage data of a first mobile device and a second mobile device, wherein the first mobile device is associated with a first user account and the second mobile device is associated with a second user account, and wherein the device usage data comprises:
 data indicative of content accessed by the first mobile device and the second mobile device;
 historical location data which includes data indicative of one or more geolocations of the first mobile device and the second mobile device;
 data indicative of locations at which the content is accessed by the first media device and the second media device; and
 data indicative of times associated with the locations and when the content is accessed;

after a threshold amount of the device usage data is acquired, determining travel route patterns indicative of a consistent commuter route shared by the first user account and the second user account, the consistent commuter route including a particular train and a time of the particular train;

determining, using the device usage data and the consistent commuter route, a correspondence between the first user account and the second user account;

in response to the determination that the first user account corresponds to the second user account:
 transmitting to the first mobile device a first notification data indicative of the determination of the correspondence between the first user account and the second user account; and
 transmitting to the second mobile device a second notification data indicative of the determination of the correspondence between the first user account and the second user account;

receiving a first request from the first mobile device for an introduction between a first user associated with first user account and a second user associated with the second user account;

receiving a second request from the second mobile device for the introduction between the first user associated with the first user account and the second user associated with the second user account; and after receiving the first request for the introduction and the second request for the introduction, transmitting introduction data to the first and the second mobile devices which enables the first user associated with the first user account and the second user associated with the second user account to communicate with one another.

6. The computer-implemented method of claim 5, wherein the travel route patterns are associated with a day of a week.

7. The computer-implemented method of claim 5, wherein the device usage data includes data representative of at least one of:
content purchased by a plurality of users, including the first user and the second user;
web pages visited by the plurality of users;
categories of music listened to by the plurality of users; or
types of media devices used by the plurality of users.

8. The computer-implemented method of claim 5, wherein the device usage data includes data indicative of content accessed using the first user account and the second user account, the content including at least one of audio data, video data, electronic book data, or application data.

9. The computer-implemented method of claim 5, wherein the historical location data further includes
data indicative of a first floor of a first building associated with the first user account and a second floor of a second building associated with the second user account.

10. The computer-implemented method of claim 9, wherein:
the first floor is different from the second floor; and
the first building is different from the second building.

11. The computer-implemented method of claim 5, wherein the determination that the first user account corresponds to the second user account occurs in response to:

a first threshold amount of time elapsing;

a first travel route pattern associated with the first user account overlapping a second threshold amount of a second travel route pattern associated with the second user account; and a third threshold number of characteristics associating the first user account and the second user account.

12. The computer-implemented method of claim 5, wherein the device usage data is acquired from at least one of a server, a first media device or a second media device.

13. The method of claim 5, wherein the consistent commuter route includes a particular train car.

14. The computer-implemented method of claim 5, wherein the introduction data is configured to one or more of omit or conceal identifying information of the first user and the second user while the first user and the second user communicate with one another.

15. The computer-implemented method of claim 5, wherein the notification data includes data indicative of one or more of a date, a time, or a place at which the second user is invited to attend.

16. A server device comprising:

a processor; and a memory device operatively coupled to the processor, the memory device configured to store computer-readable instructions and a datastore, wherein the datastore includes information associated with historical content usage data, historical location data, and historical time data of a plurality of media devices, and the instructions when executed by the processor, cause the processor to:

access the historical content usage data indicative of particular content accessed by a first media device and a second media device;

access the historical location data which includes:

data indicative of locations of the first media device and locations of the second media device, the locations indicative of a consistent commuter route shared by the first media device and the second media device, and the consistent commuter route includes a bus route and a time of the bus route; and data indicative of locations at which the particular content is accessed by the first media device and locations at which the particular content is accessed by the second media device;

access the historical time data which includes:

data indicative of location times associated with the locations of the first media device and location times associated with the locations of the second media device; and data indicative of content access times at which the particular content is accessed by the first media device and content access times at which the particular content is accessed by the second media device;

determine, using the historical content usage data, the historical location data, and the historical time data, that a first user account associated with the first media device corresponds to a second user account associated with the second media device;

in response to the determination that the first user account corresponds to the second user account, transmit notification data to the first media device and the second media device, the notification data indicative of an occurrence of the determination that the first user account corresponds to the second user account;

receive, from the first media device a first request for an introduction;

receive, from the second media device a second request for an introduction; and in response to the receiving the first request for the introduction and the second request for the introduction, transmit, to the first media device and the second media device, introduction data configured to enable a first user associated with the first media device and a second user associated with the second media device to communicate with one another.

17. The server of claim 16, wherein the instructions, when executed by the processor, cause the processor to send a request to the second media device to access the historical content usage data associated with the second media device, the historical location data associated with the second media device, and the historical time data associated with the second media device.

18. The server of claim 16, wherein the notification data includes data indicative of a date, a time, and a place at which the second user is invited to attend.

19. The server of claim 16, wherein the historical time data further indicates times at which the first media device is in a powered on state.

20. The server of claim 16, wherein the introduction data is configured to omit or conceal identifying information of the first user and the second user while the first user and the second user communicate with one another.

* * * * *